United States Patent [19]
Ryan et al.

[11] Patent Number: 5,977,223
[45] Date of Patent: Nov. 2, 1999

[54] ELASTOMERIC ARTICLES

[75] Inventors: Allison Marie Ryan, Massillon; Jeffery G. Nile, Alliance; Stanley J. Gromelski, Canton, all of Ohio; Steven Thomas Hardwick; Richard Milner, both of York, United Kingdom; Paul Cacioli, Melaka, Malaysia

[73] Assignee: Ansell Healthcare Products, Inc., Massillon, Ohio

[21] Appl. No.: 08/989,704

[22] Filed: Dec. 12, 1997

Related U.S. Application Data

[63] Continuation-in-part of application No. 08/601,060, filed as application No. PCT/GB94/01852, Aug. 24, 1994, abandoned.

[51] Int. Cl.[6] ............................. C08L 75/04; B29C 41/02
[52] U.S. Cl. ..................... 524/221; 524/247; 524/285; 524/296; 524/297; 524/299; 524/314; 524/317; 524/318; 524/368; 524/375; 524/378; 524/394; 524/590; 524/591; 523/105; 264/299; 264/301
[58] Field of Search ................................ 264/299, 301; 523/105; 524/590, 591, 285, 296, 297, 299, 314, 317, 318, 375, 378, 368, 394, 221, 247

[56] References Cited

U.S. PATENT DOCUMENTS

| | | | |
|---|---|---|---|
| 2,968,575 | 1/1961 | Mallonee | 106/287 |
| 4,644,030 | 2/1987 | Loewrigkeit | 524/457 |
| 4,888,379 | 12/1989 | Henning | 524/500 |

FOREIGN PATENT DOCUMENTS

| | | |
|---|---|---|
| 05132567 | 5/1993 | Japan . |
| 8908672 | 9/1989 | WIPO . |

OTHER PUBLICATIONS

Sadowski, J.S., et al. "Polyurethane Latexes for Coagulation Dipping", Elastomerics pp. 17–20, Aug. 1978.

*Primary Examiner*—Patricia A. Short
*Attorney, Agent, or Firm*—Gardner, Carton & Douglas

[57] ABSTRACT

A method of manufacturing a thin-walled polyurethane article includes dipping a shaped former into a coagulant solution and subsequently dipping the shaped former into an aqueous-phase polyurethane/plasticizer dispersion wherein the unplasticized polyurethane has a mean particle size of between about 0.5 μm and 1.0 μm and wherein the plasticizer causes the polyurethane particles to swell until they have a mean particle size of between about 1.5 μm and 3.0 μm. Articles so produced have a thickness of between 0.03 mm to 1.0 mm, a tensile strength of between 17 MPa and 60 Mpa and an elongation at break of greater than 650%.

20 Claims, No Drawings

ELASTOMERIC ARTICLES

This is a continuation-in-part of application Ser. No. 08/601,060, filed Aug. 8, 1996, which is a 371 of PCT/GB/94/01852 filed Aug. 24, 1994 now abandoned.

FIELD OF THE INVENTION

This invention relates to elastomeric thin-walled articles and methods for their preparation. More particularly, the invention relates to elastomeric thin-walled articles manufactured of plasticized aqueous phase polyurethanes having mean plasticized particle sizes greater than about 1.5 $\mu$m.

BACKGROUND OF THE INVENTION

Elastomeric thin-walled articles, such as gloves for surgical use, are generally manufactured from natural rubber, usually by dipping a glove former into a vessel containing natural rubber latex. However, problems have been encountered with natural rubber surgical gloves since small quantities of proteins may leach from the glove.

As a result, attempts have been made to manufacture surgical gloves from synthetic materials such as polyurethane. For example, U.S. Pat. No. 4,463,156 to McGary, Jr., describes, in Example 14, the manufacture of a mixed diol, 4,4'-diphenylmethane diisocyanate polyurethane. A 20% solids solution of the polyurethane was prepared and a glove produced by dipping a glove former into the suspension. However, such polyurethane suspensions tend to be fairly unstable during storage and therefore do not lend themselves to production processes.

European Patent Application No. 0413467 discloses polyurethane condoms which are manufactured by dipping a suitably shaped former into an organic solvent solution of a polyurethane. However, such processes contain undesirable solvents that give rise to increased costs and problems with waste products.

Another major problem associated with the use of elastomeric materials, such as polyurethane, is the presence of voids and microporosities that reduce elastomer strength and elongation. Elastomer, or polymer, strength and elongation depend on the concentration and intrinsic strength of the polymer and is a function of both the structure of the polymer and its molecular weight.

The absence of voids in protective coatings and for articles, such as condoms and gloves, is also essential to prevent the transmission of viruses and causing other injuries. Voids can develop where polymerization or coagulation of particles is interrupted by solid impurities that are not wetted by the curing elastomer, as is the case with the macromolecules forming latexes. Likewise, although the detailed microscopic mechanisms of systems undergoing phase transitions are not completely understood, especially near phase transitions where large numbers of particles act coherently, voids tend to develop in the interstitial spaces between relatively large elastomer molecules when articles are formed by the evaporation of liquids, such as solvents or carrier liquids. As a result, polymer particle size and size distribution are important and limiting characteristics affecting film formation.

The drying of polymer coatings is commonly characterized by four stages: ordering, deformation, coalescence and interdiffusion. Ordering occurs as water or other liquids evaporate and polymer particles approach each other to form a close-packed array. Deformation occurs when the particles subsequently deform to fill the interstitial space between them but remain physically separated by hydrophilic layers consisting of water and surfactant material. Coalescence occurs as the hydrophilic membranes begin to break up and the particles come into contact with one another. Finally, interdiffusion occurs when the polymer chains diffuse across particle boundaries. Interdiffusion leads to mechanical strength and the loss of all notice of the initial particles. However, the described drying mechanism previously precluded their use because the relatively large interstitial spaces between the particles trapped large amounts of liquids, compared to the amount of liquid in the smaller interstitial spaces between small particles. That resulted in poor drying of the polymer film and, thus, poor mechanical characteristics to the product. Prior art compositions exhibit less advantageous mechanical properties as particle size increases. In addition, the compositions tend to form undesirable agglomerations after a prolonged period of storage.

Sadowski et al. (J. S. Sadowski, B. Martin and D. D. Gerst, "Polyurethane Latexes for Coagulation Dipping," Elastomerics, August 1978, 17–20) recognized that particle size is, relatively, one of the most critical factors in the selection of aqueous-based dispersions. Sadowski et al. disclosed that polyurethane gloves may be made by the "Anode" process that dips a former into a coagulant bath and then dips the former into a polyurethane latex with a particle size between 0.06 to 0.3 $\mu$m. With particle sizes above about 0.3 $\mu$m, the dispersions become increasingly less suitable for the production of thin coatings because dispersions with a fairly high average particle size tend to settle out. In accordance with the prior art, it is therefore preferable to employ a dispersion having an average particle size of no more than 0.3 $\mu$m.

To date, polyurethane gloves manufactured using Sadowski et al.'s method or any other coagulation dipping method have never been made commercially available. Thus, there has been a long felt want for a commercially viable process for the dispersion dipping of polyurethane articles and polyurethane gloves in particular.

SUMMARY OF THE INVENTION

According to the invention we provide a method of manufacturing a thin-walled polyurethane article, and the article produced thereby, by dipping a shaped former into a solution which comprises an aqueous-phase polyurethane having a mean particle size of greater than about 0.5 $\mu$m, and a plasticizer that causes the polyurethane particles to swell until they have a mean particle size of between about 1.5 $\mu$m and 3.0 $\mu$m.

According to the invention we also provide a thin-walled article made from a polyurethane solution that avoids the substantial use of organic solvents.

We further provide the use of an aqueous polyurethane dispersion having a mean plasticized polyurethane particle size greater than about 1.5 $\mu$m in the manufacture of a thin-walled polyurethane article according to the invention.

The invention also provides a thin-walled article that does not contain voids or micropososities when it dries.

According to the invention we also provide a thin-walled polyurethane article wherein the polyurethane has a weight average molecular weight of less than 250,000.

DETAILED DESCRIPTION OF THE INVENTION

According to the present invention, various articles, and in particular gloves, may be manufactured using a variety of different dipping techniques, many of which are relatively conventional. According to a preferred embodiment, the gloves may be automatically produced in a mass production. Such a technique will involve use of an apparatus for conveying and manipulating many individual glove formers between various stations of the production line. The formers are usually made from porcelain, steel or plastic. Thus, gloves may be produced directly on the formers, which are conveyed from one station to the next, by depositing materials such as surfactants, waxes, coagulants and resins to obtain a layer of the desired characteristics. Such a technique allows the material to be engineered to suit by altering the composition, the order of application, and the method of application of ingredients that make up the layer. In addition, specific characteristics of the material, such as breathability, moisture absorbency, thickness, tensile strength, penetration resistance, stretch characteristics, flexibility and density may be rather precisely controlled.

The glove may be built up from multiple dips into various substances. Thus, the invention provides a method of manufacturing a thin-walled polyurethane article which comprises first dipping a suitably shaped former for a glove or condom into a coagulant solution, optionally drying the coagulant coated former, then dipping the coagulant coated former into a polyurethane dispersion. Each former is initially dipped into a vat containing a coagulant dip. The coagulant dip supplies a release material for the subsequent removal of the finished product from the formers. In addition, the coagulant material will destabilize subsequent liquid resin materials such as polyurethane elastomers which may be applied.

Preferred coagulants are ionic coagulants (e.g., mono-, di- and tri-valent cations). Examples of monovalent cationic coagulants include quaternary ammonium salts such as cyclohexylamine salts (e.g., cyclohexylamine acetate). Divalent cationic coagulants are preferred, such as alkaline earth metal salts (e.g., calcium salts) or transition metal salts (e.g., zinc salts). The nitrates of these salts are preferred and, thus, the most preferred coagulant is calcium nitrate. In addition to conventional coagulants, heat sensitizing agents may also be used. Thus, heat sensitizing agents such as polyether siloxanes may be mixed with the polyurethane dispersion. The amount of coagulant present in the coagulant solution may be from 5 to 60% w/w solution, preferably from 5 to 40% w/w and more preferably from 10 to 35% w/w.

After the coagulant dip is applied, the formers are preferably conveyed to the next station in the production line where the laminate layer is applied to the formers. The laminate layer is formed by dipping the former into an aqueous dispersion comprising polyurethane, plasticizer and, optionally, a surfactant. A variety of polyurethanes may be used in the manufacture of the articles of the invention, including aromatic and aliphatic polyethers, polyesters and blends thereof. The preferred polyurethanes are anionic polyurethanes and especially those prepared from polyethers or polyesters. Aromatic polyesters may be used and aliphatic polyesters are preferred. Similarly, although aromatic diisocyanates may be used, linear aliphatic diisocyanates are preferred. It is especially preferred to use diisocyanates which can render flexibility to the polyurethane, such as cyclohexane diisocyanates and alkylcyclohexane diisocyanates. According to the present invention, the polyurethanes can also include long chain diols and polyamines. Preferred polyurethanes are those anionic aliphatic polyester polyurethanes sold under the tradenames Bayhydrol DLN and Bayhydrol PR-240 (available from Bayer Corp., Pittsburgh, Pa.). Other suitable aqueous polyurethanes currently available in marketplace include those sold under the tradenames Witcobond (available from Witco Corp., Chicago, Ill.), Aquathanes (available from Reichhold Chemical, Inc., Raleigh, N.C.) and Astacin (available from BASF Corp., Charlotte, N.C.).

As explained more fully, below, polyurethanes with a larger particle size than that disclosed by Sadowski et al. can advantageously be formed into an aqueous dispersion which is sufficiently unstable to electrolytes to permit thin layer coatings to be formed (e.g., in the manufacture of gloves), which does not suffer the drying problems traditionally associated with large particle size elastomers and which possesses adequate shelf life.

Particle size is defined as the mean diameter for generally spherical particles. However, for irregularly shaped particles, it is the diameter of the equivalent sphere which has the same volume as the particle. Particle size of a dispersion is characteristically determined by not only the particle diameter, expressed in microns, but in the frequency within a given size range which can be expressed as the particle size distribution. Other useful measures to express polydispersity include particle mass and particle volume. Ideally, the goal in producing a dispersion is to achieve a consistently fine particle size dispersion within a narrow distribution of particle diameters. Since most polymer materials have a Gaussian type of particle size distribution, the position of the maximum is the mean particle diameter and the standard deviation represents the distribution width.

In practice, the less the particle size distribution the more uniform the arrangement of the particles during the ordering and subsequent stages of the drying process and the more uniformly and efficiently the polymer will dry. Thus, the presence of larger particles, such as those of the present invention, were sought to be avoided by the prior art. Consistent with the teachings of the prior art, the polyurethane particle size of the present invention is essentially unsuitable for use in the manufacture of thin-walled articles such as gloves. However, if the polyurethane particles of the present invention are caused to swell or increase in size by means of a suitable plasticizer, as described below, then thin-walled articles having performance characteristics comparable to prior art articles may be obtained despite the large particle size dispersion of the present invention. That is, whereas gloves manufactured with unplasticized, large particle size polyurethane results in gloves with, for example, unsatisfactory cohesiveness, integrity and barrier protection, large particle size polyurethane further enlarged by plasticization unexpectedly gave good cohesiveness, integrity and barrier protection. An important feature of this invention is, thus, the plasticization of a swellable polyurethane to increase the polyurethane particle size without impairing the drying process.

The mean particle size of polyurethane dispersions can be measured using conventional methods such as electron microscopy or by means of a conventional particle size analyzer. Polyurethane particles are always obtained with a particle size distribution. In the present invention, the mean, unplasticized particle size may be from about 0.5 $\mu$m to 1.0 $\mu$m, preferably from 0.6 $\mu$m to 0.8 $\mu$m. As plasticized, the mean particle size of the present invention may be from about 1.5 $\mu$m to about 3.0 $\mu$m and preferably from 2.0 $\mu$m to 2.5 $\mu$m. Thus, the particle size of the polyurethane resin used is important in determining suitability of the resin for use in manufacturing thin-walled articles, such as surgical gloves. In particular, superior articles are produced when a polymer of polyurethane is combined with a plasticizer, whereby the average particle size of the polyurethane is relatively large after absorption of a plasticizer as compared to the average particle size of the polyurethane prior to absorption of a plasticizer.

The molecular weight of the polyurethane in the dispersion may vary but, preferably, the weight average molecular weight ($M_w$) is from 100,000 to 250,000, more preferably from 200,000 to 250,000 (e.g., 244,000). The number average molecular weight ($M_n$) may be from 50,000 to 100,000, preferably from 60,000 to 80,000 (e.g., 74,000).

The concentration of the polyurethane in the aqueous dispersion (i.e., the solids content) may be from 10 to 80% w/w, preferably 35 to 45% w/w.

The presence of a plasticizer in the polyurethane dispersion can also overcome or mitigate the problems of the prior art. A plasticizer is a high-boiling solvent or softening agent, usually liquid, added to a polymer to facilitate processing or to increase flexibility or toughness. Although polyurethanes with large particle sizes are traditionally unsuitable for use because the large interstitial spaces between the particles impede drying, the plasticization of swellable aqueous phase polyurethanes to increase the polyurethane particle size actually makes that polyurethane suitable for use despite its even larger particle size. Thus, the present invention provides a polyurethane dispersion comprising a plasticizer.

The amount of plasticizer present in the polyurethane dispersion may be from about 1 to 30 parts per hundred, based on dry polyurethane weight, and preferably from about 5 to 25 parts per hundred. Typical of the plasticizers which may be used in accordance with the present invention are phthalate plasticizers such as: dimethyl phthalate, diethyl phthalate, dimethoxy-ethyl phthalate, dibutyl phthalate, butyl cyclohexyl phthalate, butyl benzyl phthalate, dibutoxy ethyl phthalate, di-2-ethylbutyl phthalate, bis(diethylene glycol monoethyl ether) phthalate, di-n-hexyl phthalate, di-2-ethylhexyl phthalate, diiso-octyl phthalate, di-2-ethylhexyl hexahydrophthalate. Other suitable plasticizers include aromatic and alkyl phosphate esters and aromatic and aliphatic esters of diacids, such as esters of alkanedioic acids and especially esters of dibenzoic acid. Adipate and sebecate plasticizers my also be used in accordance with the present invention. These plasticizers may be used alone or in combination as a mixture of plasticizers.

The presence of surfactant in the polyurethane dispersion increases the stability of the large particle size polyurethane dispersion and provides advantageous film forming properties. Thus, in the manufacture of thin-walled articles, it may be advantageous to have a surfactant present. The amount of surfactant may vary according to the type of surfactant used, the nature of the polyurethane, the particle size of the polyurethane and the solids content of the dispersion. The amount of surfactant present, however, should be at least sufficient to exceed the critical micelle concentration in the dispersion. More particularly, it is preferred to use an amount of surfactant in the dispersion so that the surface tension of the dispersion approaches that of natural rubber latex. Thus, it is preferred that the dispersion have a surface tension of from 20 to 50 dynes $cm^{-1}$, preferably from 25 to 45 dynes $cm^{-1}$ and more preferably from 30 to 40 dynes $cm^{-1}$. Thus, according to the present invention the polyurethane dispersion comprises from about 0.1 to 5 parts per hundred of surfactant, based on dry polyurethane weight, preferably from about 0.5 to 1.0 parts per hundred.

Any conventional surfactant may be used, including non-ionic surfactants, ionic surfactants (e.g., anionic surfactants) or a mixture of two or more ionic and non-ionic surfactants.

Of the ionic surfactants, anionic surfactants are preferred. Examples of suitable anionic surfactants include carboxylate surfactants. Carboxylate surfactants are typically derived from $C_{10}$ to $C_{20}$ straight chain fatty acids which may optionally be saturated or unsaturated. Conventionally known salts of carboxylate surfactants may be used. Such salts include ammonium or alkyl ammonium salts (e.g., triethylamine or morpholine salts) or alkali metal salts (e.g., sodium or potassium salts). In addition to the fatty acids, salts of other acids may be used including oleic, ricinoleic and rosin acids or the n-alkyl sarcosides. Here, the invention preferably includes sulfosuccinate. The invention is not limited to the surfactants hereinbefore described and may also include mixtures of two or more surfactants.

Non-ionic surfactants are particularly preferred and examples of suitable non-ionic surfactants include those described in "Surfactant and Interfacial Phenomens," Miltan J. Rosen, (John Wiley & Sons, Inc. (1978)). Examples of non-ionic surfactants which may be used are: polyoxyethylene alkylphenols; alkylphenol ethoxylates (examples of alkylphenols are p-nonylphenol, p-octylphenol or p-dodecylphenol; polyoxyethylenated straight chain alcohols); alcohol ethoxylates (the alcohols are typically derived from coconut or tallow oils or are synthetic long carbon chain alcohols); polyoxyethylenated polyoxypropylene glycols (derived from ethylene oxide and propylene oxide); polyoxyethylenated mercaptans; long chain carboxylic acid esters (e.g., glycerol and polyglyceryl esters of natural fatty acids, propylene glycol, sorbitol and polyoxyethylenated sorbitol esters); polyoxyethylene glycol esters and polyoxyethylenated fatty acids; alkanolamine condensates; alkanolamides (e.g., alkanolamine/fatty acid condensates); and tertiary acetylenic glycols.

The process according to the invention may also include a curing step. Thus, following dipping an appropriately shaped former into a polyurethane dispersion, the formed article may be cured at from 60° to 150° C., preferably from 90° to 135° C. and more preferably from 100° to 130° C. Curing times may vary according to, for example, the thickness of the formed article. Curing times of from 5 to 60 minutes are appropriate.

In addition, the process according to the invention may include a leaching step. Leaching may be carried out before and/or after curing the formed article. The leaching process is intended, among other things, to remove residual coagulant and/or surfactant. It may be a characteristic of the thin-walled polyurethane articles according to the invention that residual coagulant and/or surfactant may remain in the polyurethane.

Additives may be included in the coagulant solution or the dispersion to improve the release properties of the polyurethane article, thus allowing the cured article to be more easily removed from the former. The stripping of the article from the former may be improved by the inclusion of a detackifier. Any conventional detackifiers may be used, including powders such as chalk, starch (e.g., maize starch or corn starch), clays, lycopodium powders, talc or ground whiting. In addition, liquid detackifiers conventionally used with natural rubbers may be used; these include silicone dispersions, silicone oils or polypropylene glycols.

The thickness of the flexible thin-walled polyurethane articles may be from 0.03 to 1.0 mm, preferably from 0.05 to 0.8 mm and especially from 0.05 to 0.5 mm.

Such articles are advantageous because the tensile strength or the force required to break the polyurethane remains sufficient to give the article utility. Thus, we further provide a flexible thin-walled polyurethane article having a tensile strength of from about 2400 to 4600 psi. Such tensile strength is preferably from about 2500 to 3500 psi.

In addition, the articles according to the invention have an advantageous value for elongation at break. According to the invention, we provide a flexible article made from plasticized polyurethane having an elongation at break of greater than 650%. Tensile data for polyurethane articles manufactured of plasticized and nonplasticized Bayhydrol DLN are as follows:

| Material | 100% Modulus (PSI) | 300% Modulus (PSI) | 500% Modulus (PSI) | Tensile Strength (PSI) | Elongation (%) |
|---|---|---|---|---|---|
| DLN (initial sample) | 329 | 548 | 1126 | 3756 | 666 |
| DLN lot 4707 | 371 | 681 | 1657 | 4232 | 608 |
| DLN lot 4731 | 309 | 545 | 1181 | 4450 | 677 |
| DLN (Lot unknown) | 344 | 619 | 1337 | 5151 | 675 |
| DLN (lot 4880) | 323 | 536 | 1144 | 4226 | 649 |
| DLN (lot 4853) | 296 | 474 | 939 | 4630 | 698 |
| DLN (lot 4853 with 5.0 phr plasticizer) | 279 | 432 | 824 | 4486 | 711 |
| DLN (lot 4853 with 5.0 phr plasticizer | 280 | 438 | 840 | 4733 | 713 |
| DLN (7 phr plasticizer) | 297 | 491 | 980 | 3934 | 683 |
| DLN (10 phr plasticizer) | 282 | 443 | 761 | 3480 | 738 |
| DLN (18 phr plasticizer) | 250 | 393 | 670 | 2427 | 752 |

The thin-walled articles of the invention include gloves (e.g., gloves for surgical use), condoms, sleeves, catheters, boots, bladders, balloons, teats, enema tips and other tubular articles.

While the invention has been described in conjunction with specific embodiments thereof, it is evident that alternatives, modifications and variations will be apparent to those skilled in the art in light of the foregoing description. Accordingly, it is intended to embrace all such alternatives, modifications and variations as fall within the spirit and broad scope of the appended claims.

We claim:

1. A process for fabricating a thin-walled polyurethane article which comprises:
   a. dipping a shaped former into a solution which solution comprises a coagulant;
   b. dipping the coagulant coated former into an aqueous phase polyurethane dispersion which comprises between 10 and 80 percent by weight of an aqueous phase polyurethane having a mean particle size of between about 0.5 μm and 1.0 μm, between about 1 and 30 parts per hundred of a plasticizer, based on dry polyurethane weight and wherein the plasticizer causes the polyurethane particles to swell and wherein the mean particle size of the swelled polyurethane is between 1.5 μm and 3.0 μm;
   c. removing the former from the polyurethane dispersion and subsequently leaching and curing the formed article.

2. A process according to claim 1 wherein the polyurethane solution further comprises between about 0.1 and 5 parts per hundred of a surfactant, based on dry polyurethane weight.

3. A process according to claim 2 wherein the surfactant is selected from the group of surfactants consisting of ionic and non-ionic surfactants and mixtures thereof.

4. A process according to claim 3 wherein the surfactant is selected from the group of ionic surfactants consisting of carboxylate surfactants, salts of carboxylate surfactants, salts of oleic, ricinoleic and rosin acids and n-alkyl sarcosides.

5. A process according to claim 3 wherein the surfactant is selected from the group of non-ionic surfactants consisting of polyoxyethylene alkylphenols; alkylphenol ethoxylates; alcohol ethoxylates; polyoxyethylenated polyoxypropylene glycols; polyoxyethylenated mercaptans; long chain carboxylic acid esters; polyoxyethylene glycol esters and polyoxyethylenated fatty acids; alkanolamine condensates; alkanolamides; tertiary acetylenic glycols and mixtures thereof.

6. A process according to claim 1 wherein the aqueous phase polyurethane is selected from the group of anionic polyurethanes consisting of anionic polyurethanes prepared from polyesters and polyethers and mixtures thereof.

7. A process according to claim 6 wherein the polyurethane comprises an aliphatic polyester polyurethane.

8. A process according to claim 6 wherein the polyurethane is selected from the group consisting of polyurethanes prepared from aromatic diisocyanates, ahphanic diisocyanates, long chain diols and polyamines.

9. A process according to claim 1 wherein the plasticizer is selected from the group of plasticizers consisting of dimethyl phthalate, diethyl phthalate, dimethoxy-ethyl phthalate, dibutyl phthalate, butyl cyclohexyl phthalate, butyl benzyl phthalate, dibutoxy ethyl phthalate, di-2-ethylbutyl phthalate, bis(diethylene glycol monoethyl ether) phthalate, di-n-hexyl phthalate, di-2-ethylhexyl phthalate, diiso-octyl phthalate, di-2-ethylhexyl hexahydrophthalate and mixtures thereof.

10. A process according to claim 1 wherein the plasticizer is selected from the group of plasticizers consisting of esters of diacids.

11. A process according to claim 1 wherein the aqueous phase polyurethane is selected from the group of polyurethanes having a weight average molecular weight of 100,000 to 250,000.

12. A process according to claim 1 wherein the aqueous phase polyurethane is selected from the group of polyurethanes consisting of polyurethanes prepared from aromatic polyethers, aromatic polyesters, ahphatic polyethers, ahphatic polyesters and mixtures thereof.

13. A process according to claim 1 wherein the polyurethane is a polyether/polyester polyurethane.

14. A process according to claim 1 wherein the plasticizer is butyl benzyl phthalate.

15. A thin-walled article fabricated in accordance with the process of claim 1.

16. The article of claim 15 wherein the article has a tensile strength of between 17 MPa and 60 MPa.

17. The article of claim 15 wherein the article has a thickness of between 0.03 mm to 1.0 mm.

18. The article of claim 15 wherein the article has an elongation at break of greater than 650%.

19. The article of claim 15 wherein the article is a glove.

20. The article of claim 15 wherein the article is a condom.

* * * * *